(12) United States Patent
Aharonov et al.

(10) Patent No.: US 8,082,236 B2
(45) Date of Patent: Dec. 20, 2011

(54) WRITE FAILURE PROTECTION FOR HIERARCHICAL INTEGRITY SCHEMES

(75) Inventors: Arseniy Aharonov, Arad (IL); Boris Dolgunov, Ramat Gan (IL)

(73) Assignee: SanDisk IL Ltd., Kfar Saba (IL)

( * ) Notice: Subject to any disclaimer, the term of this patent is extended or adjusted under 35 U.S.C. 154(b) by 491 days.

(21) Appl. No.: 12/252,784

(22) Filed: Oct. 16, 2008

(65) Prior Publication Data

US 2009/0112823 A1    Apr. 30, 2009

(30) Foreign Application Priority Data

Oct. 30, 2007  (IL) .......................................... 187042

(51) Int. Cl.
*G06F 17/30* (2006.01)
(52) U.S. Cl. .......................... 707/694; 707/828; 713/153
(58) Field of Classification Search ........... 707/999.008, 707/694, 704, 828; 713/168, 153
See application file for complete search history.

(56) References Cited

U.S. PATENT DOCUMENTS

| | | | |
|---|---|---|---|
| 5,532,463 A | 7/1996 | Debelleix et al. | |
| 5,864,839 A * | 1/1999 | Bourgoin ............................... | 1/1 |
| 6,480,839 B1 * | 11/2002 | Whittington et al. ................. | 1/1 |
| 6,640,305 B2 | 10/2003 | Kocher et al. | |
| 2006/0107047 A1 | 5/2006 | Bar-El | |
| 2006/0130046 A1 | 6/2006 | O'Neill | |

FOREIGN PATENT DOCUMENTS

| | | |
|---|---|---|
| GB | 2349242 | 10/2000 |
| WO | WO-2006022667 | 3/2006 |
| WO | WO-2007004107 | 1/2007 |

OTHER PUBLICATIONS

International Search Report and Written Opinion for PCT/IL2008/001394, dated May 2, 2009, 13 pages.
International Preliminary Report on Patentability for PCT/IL2008/001394, dated May 14, 2010, 8 pages.

* cited by examiner

*Primary Examiner* — Etienne LeRoux
*Assistant Examiner* — Monica Pyo
(74) *Attorney, Agent, or Firm* — Brinks Hofer Gilson & Lione (57) ABSTRACT

A method for data integrity protection includes arranging in an integrity hierarchy a plurality of data blocks, which contain data. The integrity hierarchy includes multiple levels of signature blocks containing signatures computed respectively over lower levels in the hierarchy, wherein the levels culminate in a top-level block containing a top-level signature computed over the hierarchy. A modification to be made in the data stored in a given data block is received. One or more of the signatures is recomputed in response to the modification, including the top-level signature. Copies of the given data block, and of the signature blocks, including a copy of the top-level block, are stored in respective locations in a storage medium. An indication that the copy is a valid version of the top-level block is recorded in the copy of the top-level block.

8 Claims, 4 Drawing Sheets

WRITE FAILURE PROTECTION FOR HIERARCHICAL INTEGRITY SCHEMES

FIELD OF THE INVENTION

The present invention relates generally to data storage systems, and specifically to methods and systems for maintaining the integrity of stored data.

BACKGROUND OF THE INVENTION

Structural integrity schemes are used in data storage applications to protect data from being modified without authorization. Such schemes typically use a structure comprising one or more levels of signatures to protect data integrity.

SUMMARY OF THE INVENTION

Various embodiments of a system and method for data integrity protection are possible. An embodiment of a method for data integrity protection may include arranging in an integrity hierarchy a plurality of data blocks, which contain data. The integrity hierarchy includes multiple levels of signature blocks containing signatures computed respectively over lower levels in the hierarchy, wherein the levels culminate in a top-level block that contains a top-level signature computed over all of the hierarchy. The blocks of the hierarchy are stored in respective first locations in a storage medium. Upon receiving a modification to be made in the data stored in a given data block within the hierarchy, one or more of the signatures in the hierarchy are recomputed, including the top-level signature. Copies of the given data block in which the modification has been made and of the signature blocks containing the signatures that have been recomputed, including a copy of the top-level block, are stored in respective second locations in the storage medium, and an indication is recorded in the copy of the top-level block that the copy is a valid version of the top-level block.

In disclosed embodiment, the method may include receiving a subsequent modification to the data after recording the copy of the top-level block, and in response to the subsequent modification, performing a subsequent recomputation of the signatures in the hierarchy, including the top-level signature, and storing a subsequent copy of the top-level block in the first location with the indication that the subsequent copy is the valid version. Typically, recording the indication may include incrementing a value of a validity counter that is stored in the top-level block, wherein recomputing the one or more of the signatures includes computing the top-level signature over the value of the validity counter. The method may further include reading the indication from the copies of the top-level block in the first and second locations, identifying the copy of the top-level block that is the valid version responsively to the indication, and accessing the data in one or more of the data blocks using the valid version.

In some embodiments, storing the copies in the respective second locations may include storing the copy of the top-level block only after the given data block and the signature blocks in the lower levels in the hierarchy have been copied. In one embodiment, receiving the modification may include receiving a transaction including multiple modifications to be made in the data, and storing the copies in the respective second locations may include completing all of the modifications that are associated with the transaction in the data and signature blocks in the lower levels in the hierarchy before storing the copy of the top-level block.

Typically, the method may include recording, in the copy of the top-level block, pointers to the respective second locations of the given data block and the signature blocks containing the signatures that have been recomputed. In one embodiment, the pointers may include a respective flag for each of the data blocks and the signature blocks in the lower levels of the hierarchy, indicating whether valid copies of the blocks are stored in the first or the second locations. In another embodiment, the pointers may include a list of the data blocks and the signature blocks in the lower levels of the hierarchy of which valid copies are stored in the second location.

Recomputing the one or more of the signatures may typically include recomputing a block signature of the given block.

Another embodiment may provide apparatus for data integrity protection, including a storage medium and a storage controller, which is configured to arrange in an integrity hierarchy a plurality of data blocks, which contain data. The integrity hierarchy includes multiple levels of signature blocks containing signatures computed respectively over lower levels in the hierarchy, wherein the levels culminate in a top-level block that contains a top-level signature computed over all of the hierarchy, and to store the blocks of the hierarchy in respective first locations in the storage medium. The storage controller is configured, upon receiving a modification to be made in the data stored in a given data block within the hierarchy, to recompute, in response to the modification, one or more of the signatures in the hierarchy, including the top-level signature, to store in respective second locations in the storage medium copies of the given data block in which the modification has been made and of the signature blocks containing the signatures that have been recomputed, including a copy of the top-level block, and to record in the copy of the top-level block an indication that the copy is a valid version of the top-level block.

An additional embodiment may provide a software product, including a machine-readable medium in which program instructions are stored, which instructions, when read by a programmable controller that is coupled to a storage medium, cause the controller to arrange in an integrity hierarchy a plurality of data blocks, which contain data, the integrity hierarchy including multiple levels of signature blocks containing signatures computed respectively over lower levels in the hierarchy, wherein the levels culminate in a top-level block that contains a top-level signature computed over all of the hierarchy, and to store the blocks of the hierarchy in respective first locations in the storage medium. The instructions cause the controller, upon receiving a modification to be made in the data stored in a given data block within the hierarchy, to recompute, in response to the modification, one or more of the signatures in the hierarchy, including the top-level signature, to store in respective second locations in the storage medium copies of the given data block in which the modification has been made and of the signature blocks containing the signatures that have been recomputed, including a copy of the top-level block, and to record in the copy of the top-level block an indication that the copy is a valid version of the top-level block.

The present invention will be more fully understood from the following detailed description of the embodiments thereof, taken together with the drawings in which:

DETAILED DESCRIPTION OF EMBODIMENTS

Overview

Secure data storage systems often use signatures to provide integrity protection. In the context of the present patent application and in the claims, the term "signature" is used broadly to refer to any code that is calculated over an element of data and may subsequently be used to verify that the data element has not changed since the code was calculated. There are many types of signatures utilized in secure data storage systems. These include, but are not limited to—MAC, hash, CRC, PGP, and PKI:

- A cryptographic message authentication code (MAC) is a short piece of information used to authenticate a message.
- A cryptographic hash function is a transformation that takes an input and returns a fixed-size string, which is called the hash value.
- A cyclic redundancy check (CRC) is a type of function that takes as input a data stream of any length and produces as output a value of a certain fixed size.
- Pretty Good Privacy (PGP) encryption uses public-key cryptography and includes a system which binds public keys to a user name.
- A public key infrastructure (PKI) is an arrangement that binds public keys with respective user identities by means of a certificate authority.

In some hierarchical data integrity schemes, a signature is created for each data block being stored in a storage medium and is updated when any data is added or changed. An upper-level signature is computed over the signatures of the data blocks to protect the integrity of the signatures. The upper-level signatures may themselves be protected by one or more levels of super-signatures, in a hierarchical manner, up to the top-level signature, which verifies the integrity of the entire data structure. The successive levels of signatures are stored in corresponding levels of signature blocks, up to a top-level block. Upon receiving a request to access a particular data block, the storage system typically checks the data in the block against the relevant signatures in all of the levels in the hierarchy to verify that the data and signatures are valid and have not been tampered with.

When a data block is modified, multiple levels of signature blocks, up to the top-level block, must be updated, as well. If the storage system undergoes a write failure while it is updating and storing signature blocks, due to sudden power loss, for example, the results can be catastrophic, since after normal operation is restored, one or more of the stored signatures may not match the contents of the corresponding data blocks or lower-level signature blocks. In such a situation, the storage system will regard those data blocks and lower-level signature blocks as invalid. If a given signature block is invalid, then all of the blocks below it in the hierarchy are invalid, as well. Thus, if the top-level signature is corrupted in this fashion, the entire storage hierarchy will be considered invalid.

Embodiments of the present invention that are described hereinbelow address this problem by writing changes to a mirror version of the hierarchy in the storage medium. Upon receiving a modification to be made in the data stored in a given data block within the hierarchy, the controller of the storage system recomputes the appropriate signatures in the hierarchy, including the top-level signature. The controller stores copies of the modified data block and of the signature blocks containing recomputed signatures (including a copy of the top-level block) in new locations in the storage medium, without overwriting the unmodified versions of the blocks in their original locations.

The controller writes the modified copy of the top-level block to the new location only after all the lower-level blocks have been rewritten. This copy of the top-level block contains an indication that it is the valid version of the top-level block, as well as pointers to the locations of the valid copies of the modified data and signature blocks. Thus, if a write failure occurs during the process of updating the hierarchy, the new top-level block will not yet have been written, and the controller will revert to the pre-update version of the top-level block, containing pointers to the previous versions of the data and signature blocks. The modified data may be lost, but the integrity hierarchy will remain intact.

At the next change to the data, the controller repeats the above process, but this time writes a new modified copy of the top-level block back to the original location. Rewritten lower-level blocks are similarly toggled back to their original locations, and the pointers in the new top-level block are updated accordingly.

System Description

Figure 1:
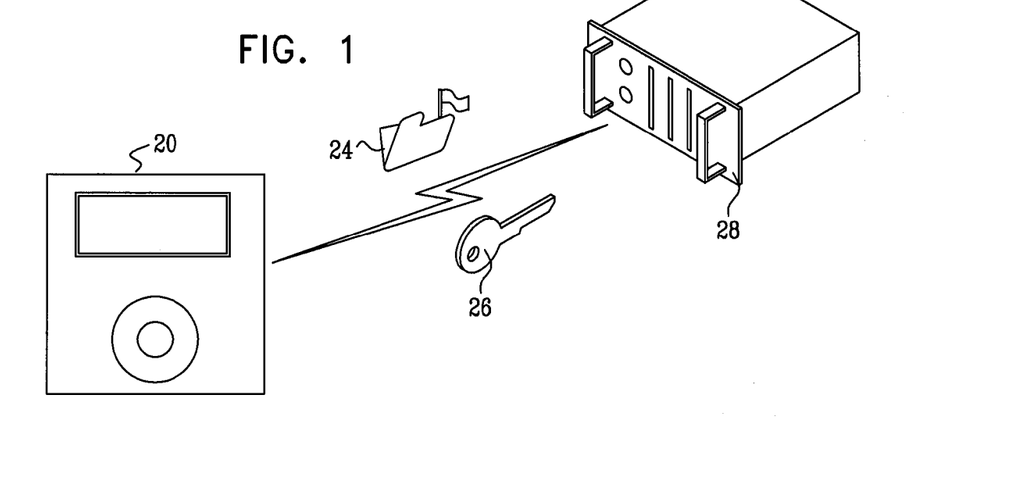
FIG. 1 is a schematic, pictorial illustration of a device for storing data using a hierarchical integrity scheme, in accordance with an embodiment of the present invention.

FIG. 1 is a schematic, pictorial illustration of a media player device 20 that uses a hierarchical integrity scheme for secure data storage, in accordance with an embodiment of the present invention. Device 20 downloads an encrypted media file 24 from a media server 28 or other source. In order to decrypt and play the media file, device 20 must also download an associated cryptographic secret, in the form of a secret key 26, from server 28. Key 26 itself is typically downloaded to device 20 in a form that is inaccessible to the user of the device. Therefore, the user is unable to change, duplicate, or make any other unauthorized use of the key. Optionally, for enhanced security, the keys themselves may be stored in the device in encrypted form.

Media file 24 and key 26 are stored in memory in device 20. Typically, device 20 stores many different media files, each with its own unique key. In order to prevent unauthorized access to and use of the keys (and hence of the media files), the keys are arranged in a secure hierarchical integrity structure in the memory of device 20. This structure, as described in detail below with reference to FIG. 3, contains the keys along with multiple levels of signatures. When the user of device 20 attempts to access a given media file, the device checks the signatures that apply to the key for the file in order to verify that the key is authentic and has not been tampered with or copied illegally. After verifying the key in this manner, the device uses the key to decrypt and play the media file.

Although the embodiment shown in FIG. 1 presents one application of the present invention, this application is presented for the purpose of illustration only. The principles of the present invention may be used in any system that requires data integrity and is amenable to a hierarchical integrity scheme. The data secured by the hierarchical integrity scheme may comprise cryptographic secrets, as in the present example, or any other type of sensitive data.

Figure 2:
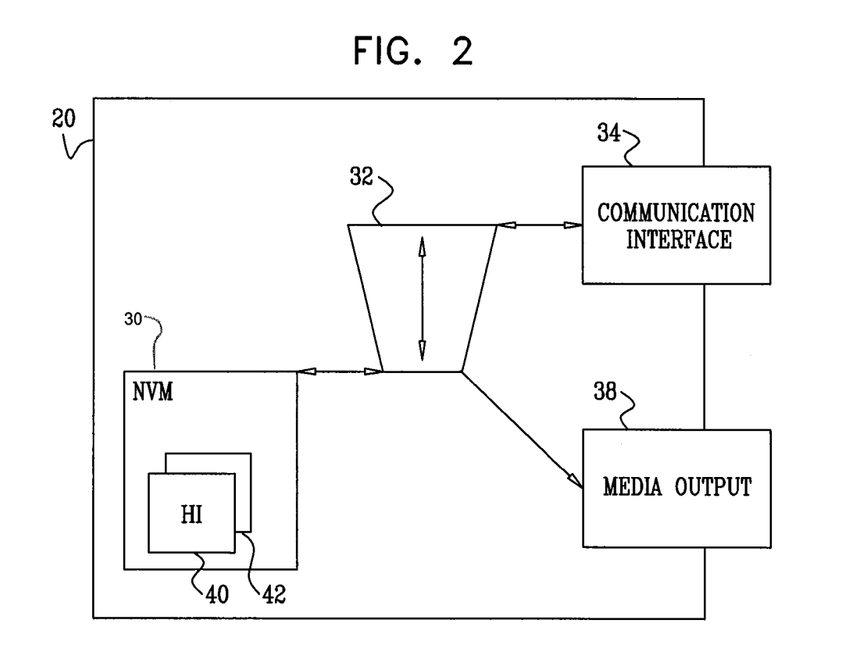
FIG. 2 is a block diagram that schematically illustrates internal details of the device of FIG. 1, in accordance with an embodiment of the present invention.

FIG. 2 is a block diagram that schematically illustrates internal details of device 20, in accordance with an embodiment of the present invention. An interface 34 passes data from an external source to a storage controller 32. As explained above, the data may include both media files and associated secret keys. Storage controller 32 stores the data in a storage medium, such as a flash memory 30. Flash memory is a non-volatile memory (NVM), which means that it does not need power to maintain the information stored in the memory. Memory 30 is typically divided into access units, i.e., groups of memory cells that are written to and read from in a single write or read operation. In flash memory, the access unit is a page, which typically comprises between 512 or 2048 Kb.

Controller 32 is typically a programmable processing device, which operates under the control of program instructions that are stored in a machine-readable medium, such as flash memory 30 or other electronic memory, or in magnetic or optical media. The instructions cause the controller to perform the data integrity-related functions that are described herein. Alternatively or additionally, some or all of the functions of the controller may be performed by dedicated processing logic.

Typically, controller 32 stores the media files and secret keys in different, respective locations in memory 30. The controller may group certain keys together in a single data block. Controller 32 computes a block signature over each data block, as well as upper-level signatures, to form a hierarchical integrity (HI) structure 40, which is shown in detail in FIG. 3. This structure is stored in memory 30, along with blocks of a mirror HI structure 42. Structure 40 is referred to herein as the default structure, in order to distinguish it from the mirror structure. Structures 40 and 42 are constructed and managed, as shown below in FIGS. 4 and 5, in a manner that protects against loss or corruption of data in case a write failure occurs while controller 32 updates memory 30. Although structures 40 and 42 are shown conceptually in FIG. 2 as contiguous areas of memory 30, in practice the structures may be distributed over multiple memory areas, with appropriate addressing logic.

When the user of device 20 asks to play a particular media file, controller 32 reads the data block containing the key from memory 30 and checks the block signature and upper-level signatures against the signature values that are stored in the memory. If the values of the signatures match, the controller uses the key 26 to decrypt the media file and transfers the decrypted file to a media output 38, such as an audio speaker, for playback. If the signature values do not match, the controller determines that the integrity of the signature has been corrupted and returns a failure message.

Although the present embodiment is described with reference to flash memory, the same principles apply to other types of storage media, including magnetic and optical, as well as electronic, memory:

Magnetic storage refers to the storage of data on a magnetized medium, such as a magnetic hard disk. Magnetic storage uses different patterns of magnetization in a magnetizable material to store data and is another form of non-volatile memory.

One form of optical storage uses tiny pits etched on the surface of a circular disc to store information. This information is read by illuminating the surface with a laser diode and observing the reflection. Optical disc storage is a form of non-volatile memory.

One form of electronic memory is random access memory (RAM). It loses the stored information when not electrically powered and is a form of volatile memory. Other types of programmable electronic memory are non-volatile, like flash memory.

Hierarchical Integrity Mechanism

Figure 3:
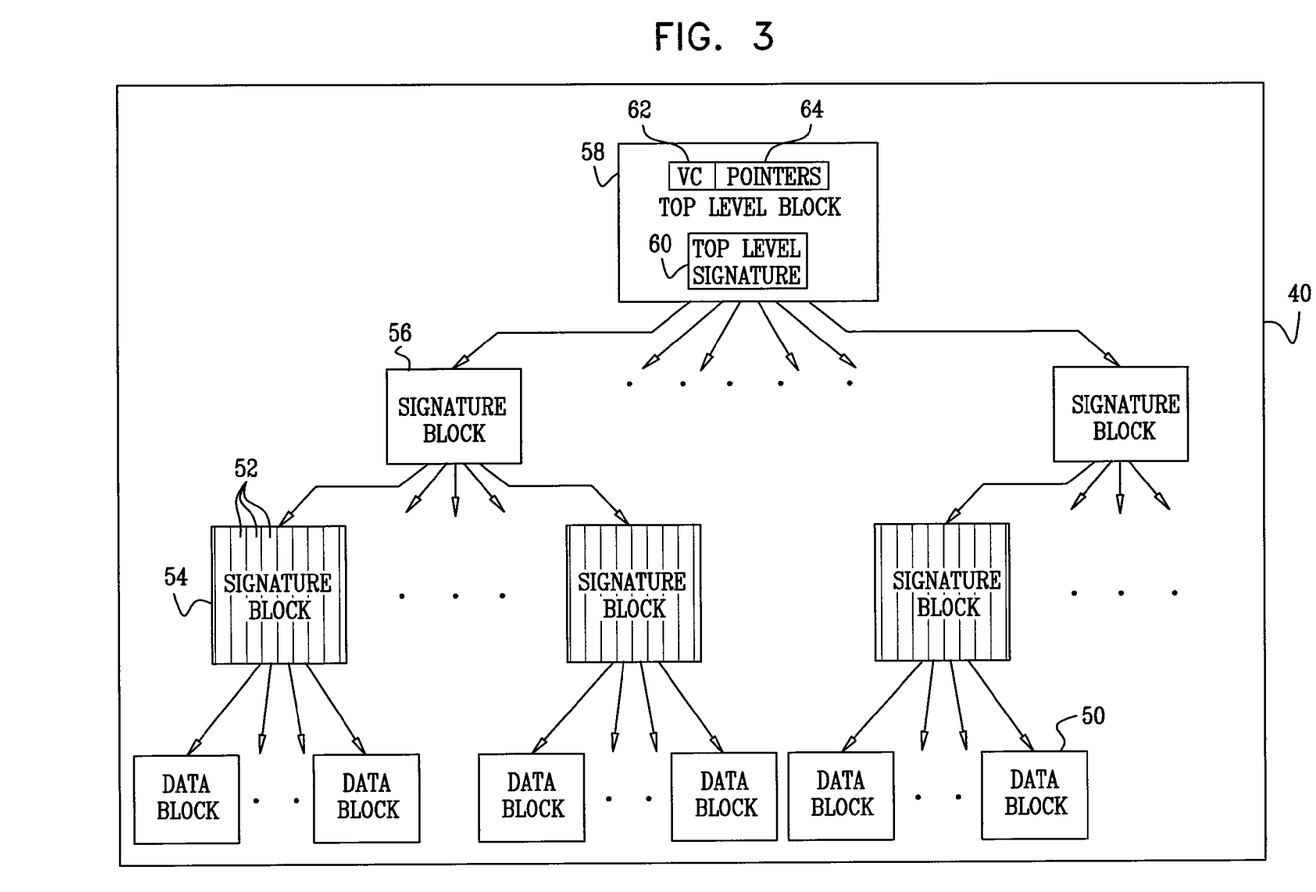
FIG. 3 is a block diagram that schematically illustrates a data structure used to store data with hierarchical integrity, in accordance with an embodiment of the present invention.

FIG. 3 is a block diagram that schematically shows details of hierarchical integrity data structure 40, in accordance with an embodiment of the present invention. The overall structure and principles of the data structure will be explained with reference to FIG. 3, followed by an explanation with reference to FIGS. 4 and 5 of the mirroring mechanism that is used to protect against write failures.

Data items are stored in structure 40 in data blocks 50. (Optionally, the data may be stored in encrypted form.) Each data block 50 is signed by controller 32 with a block signature 52. The controller may compute the signatures using any suitable method known in the art, such as the MAC, hash, CRC, PGP, or PKI types of computations mentioned above. These block signatures constitute the lowest signature level in structure 40. The block signatures themselves are also grouped into signature groups, and each group of signatures is stored by the controller in a respective signature block 54.

Each signature block 54 is itself protected by a super-signature, computed by the controller over the block signatures in the signature block. Signature blocks 54 are grouped together into super-groups, and the super-signatures of the signature blocks in each super-group are recorded in an upper-level signature block 56, which constitutes the next signature level in the integrity hierarchy. The controller typically computes and stores the signatures of all the signature levels in the same way that it treats the data blocks themselves.

The integrity hierarchy culminates in a top-level block 58, which typically contains the upper-level signatures of upper-level signature blocks 56. The controller computes a top-level signature 60 over the upper-level signatures of all of blocks 56, and thus protects the integrity of the whole data structure, including the data blocks and the signatures. For protection against re-flash attacks, the controller may include the value of a counter, which is incremented on each update, in calculation of the top-level signature (in addition to the upper-level signatures of blocks 56). Although the hierarchy in structure 40 is shown, by way of example, as comprising three levels of signature blocks 54, 56 and 58, the principles of the present invention may be applied in hierarchies having any practical number of levels of signature blocks, two or greater.

For purposes of data protection, top-level block 58 may contain two additional fields: a validity counter (VC) 62 and block pointers 64. The validity counter serves as an indication of the copy of the top-level block (in structure 40 or 42) that is the valid version. For the remaining blocks in the hierarchy, block pointers 64 indicate which blocks have their valid copies located in mirror HI structure 42. The significance and use of these fields are further described hereinbelow. They protect against possible corruption of data structure 40 due to power failure during a write operation, as well as write failures due to other causes. To ensure data integrity, top-level signature 60 is typically computed over these additional fields (or at least over VC 62), together with the upper-level signatures of blocks 56. Additionally or alternatively, the values of VC 62 and/or block pointers 64 in memory 30 may be encrypted.

Figure 4:
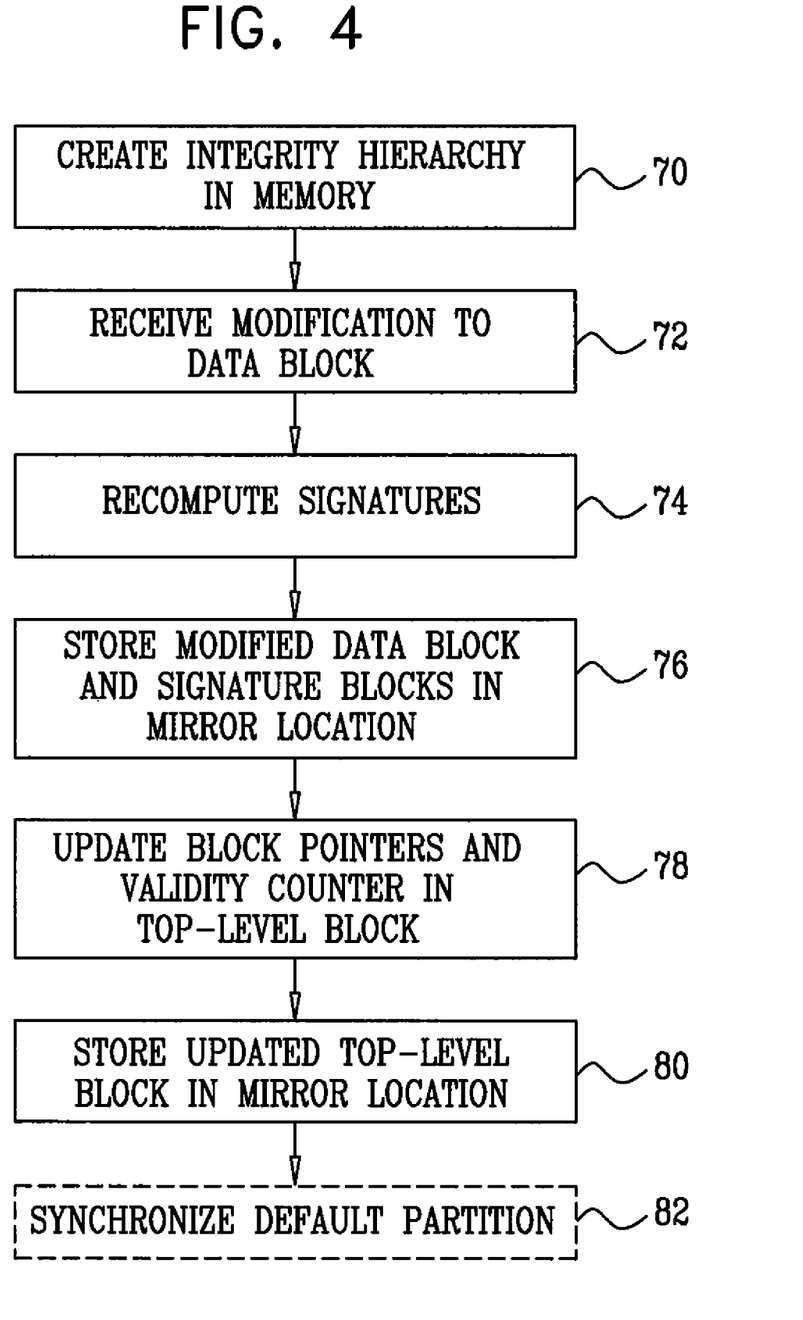
FIG. 4 is a flow chart that schematically illustrates a method for updating stored data, in accordance with an embodiment of the present invention.
Figure 5:
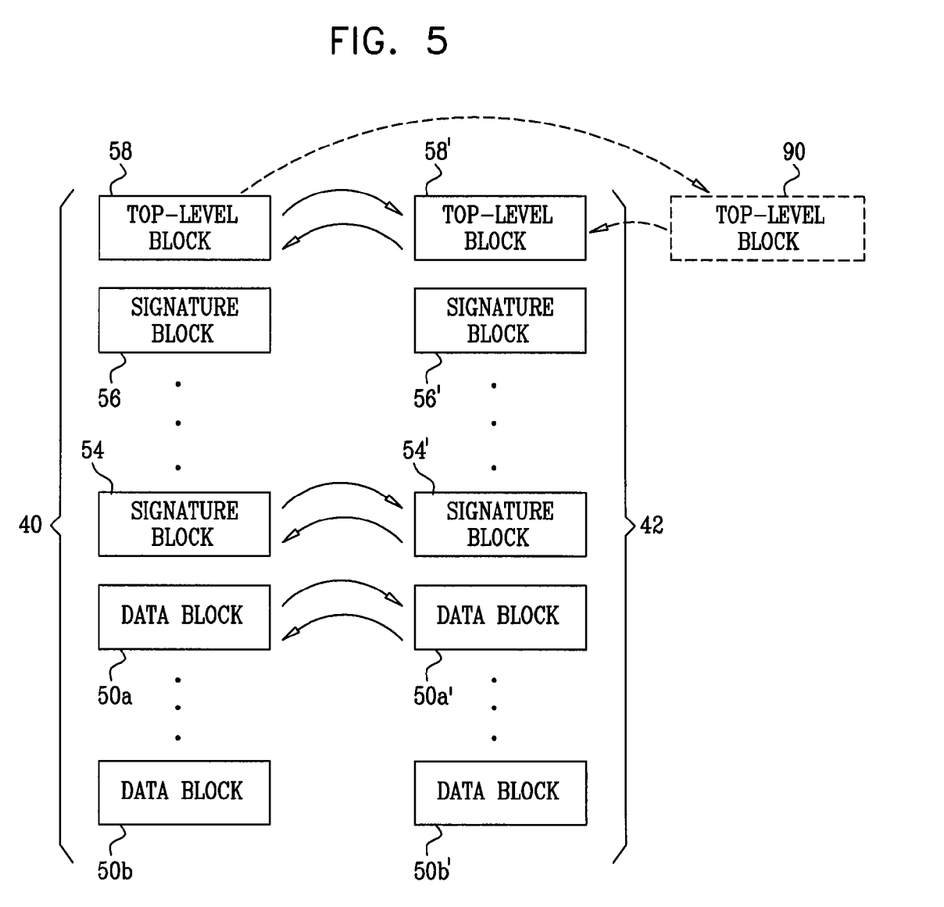
FIG. 5 is a block diagram that schematically illustrates elements of a hierarchical integrity data structure that are used in updating stored data, in accordance with an embodiment of the present invention.

Reference is now made to FIGS. 4 and 5, which schematically illustrate a method for updating data stored in hierarchical integrity data structure 40, using mirror structure 42, in accordance with an embodiment of the present invention. FIG. 4 is a flow chart showing key steps in the method. FIG. 5 is a block diagram showing elements of structures 40 and 42 that are used in the update process. FIG. 5 uses the same block numbering scheme as FIG. 3. For convenience in the description that follows, the two data blocks shown in FIG. 5 are labeled 50a and 50b. The copies of the data blocks and signature blocks that are stored in mirror structure 42 are identified by the same reference numbers as the corresponding blocks in structure 40, with the addition of the tag "'".

Upon initialization of device 20 (FIG. 2), controller 32 creates an integrity hierarchy in the form of data structure 40, as shown above in FIG. 3, at a structure creation step 70. The controller stores the structure in a certain location in memory 30. (Typically, this initialization is performed only once, and not every time the device is powered up.)

During operation of the device, controller 32 may receive a modification to one of data blocks 50, such as block 50a, at a data modification step 72. For example, the user of the device may download a new media file 24 and the corresponding key 26, which is then stored in the hierarchical integrity structure. In response to the change in data block 50a, controller 32 recomputes block signature 52 of this data block, at a signature recomputation step 74. The change in this signature changes the contents of the signature block 54 that contains the signature, so that the controller must recompute the super-signature of block 54, which will then change the contents of upper-level signature block 56, and so on up to top-level signature 60 in top-level block 58. (Alternatively, to save time, the controller may initially recompute only the block signature and the top-level signature, and may temporarily store the recomputed block signature together with the top-level signature in the top-level block.)

Controller 32 stores the modified data block 50a and signature blocks 54 and 56 in mirror structure 42, as blocks 50a', 54' and 56', respectively, at a block storage step 76. The original versions of these blocks remain unchanged in their original memory locations in default structure 40. In practice controller 32 may have only limited RAM to use in the signature computations and may be limited to writing one block at a time to memory 30 as an atomic operation. Therefore, steps 74 and 76 may be interleaved, with blocks 50a', 54' and 56' written to the memory in successive write operations, moving upward through the hierarchy, and each successive signature computed after the previous write operation has been completed. Typically, blocks 50a', 54' and 56' are stored in structure 42 at the same respective offsets, relative to the base memory address of structure 42, as the offsets of the corresponding blocks in structure 40 relative to the base memory address of structure 40.

After writing blocks 50a', 54' and 56' to their respective locations in structure 42, controller 32 updates validity counter 62 and block pointers 64 in top level block 58, at a top-level update step 78. Again, block 58 is left unchanged in structure 40, and the modified top-level block 58' is stored in mirror structure 42, at a top-level storage step 80. Only after the top-level block has been written to its new location are the changed versions of the lower-level blocks considered to be valid. Until step 80 has been successfully completed, the previous version of the top-level block remains the valid version, along with the corresponding versions of the lower-level blocks. Thus, if a write failure occurs before step 80 has been completed, controller 32 will revert automatically upon recovery to the unchanged versions of the top-level and lower-level blocks that were valid before the failure.

Validity counter 62 is updated each time the top-level block is updated. Counter 62 may comprise a simple linear counter, which is incremented in each copy. Alternatively, other types of functions, such as a linear feedback shift register (LFSR), may be incremented or otherwise updated to indicate the valid version. Thus, the term "counter," as used in the context of the present patent application and in the claims, should be understood as referring to any function that may be updated so as to provide an unambiguous indication of the most recent value of the function. At power-up of device 20 or upon recovery from a write failure, controller 32 checks top-level blocks 58 and 58' in memory 30 and chooses the version (58 or 58') that has the more advanced value of the validity counter. The controller computes the top-level signature over the upper-level signatures and the validity counter value in the chosen version of the top-level block and checks the result against the top-level signature that is stored in this top-level block. If the values match, the controller may then conclude that this top-level block is the current valid version. Otherwise, the controller uses to the previous version of the top-level block (assuming that the previous version passes the integrity test of the top-level signature).

At the next modification to a data block (step 72), controller 32 will repeat steps 74 and 76 and will then use block 58' as the basis for updating the validity counter and block pointers at step 78. During this process, the controller leaves block 58' itself unchanged in mirror structure 42. The controller writes the updated top-level block to the appropriate location in default structure 40, now overwriting the original top-level block 58. This toggling of the location of the valid top-level block, as indicate by the back-and-forth arrows in FIG. 5, ensures that the most recent previous version of the top-level block always remains available as a backup in case a write failure occurs before the new version has been written. The same sort of toggling occurs when a lower-level block, such as block 50a' or 54', is rewritten.

As noted earlier, block pointers 64 indicate, for the blocks in the lower levels of the hierarchy, whether the valid copy of the block can be found in structure 40 or 42. In one embodiment, the block pointers comprise a respective flag for each of the data blocks and the signature blocks, indicating the location of the valid copy of each block. For example, the flags may be contained in a bitmap, with one bit for each block, wherein the bit is set to indicate that the valid copy is in the mirror structure, and reset otherwise. This option is useful for small hierarchies, but may occupy excessive storage space when the hierarchy contains a large number of blocks.

Therefore, in an alternative embodiment, block pointers 64 comprise a list of the data blocks and signature blocks whose valid copies are located in mirror structure 42. All blocks not included in the list are assumed to have their valid copies located in default structure 40. When a given block is updated and copied from the default structure to the mirror structure, a corresponding block identifier is added to the block pointer list. When the block is copied back to the default structure, this block identifier is erased or is updated to point to structure 40. In order to prevent overflow of the block pointer list, controller 32 may periodically synchronize default structure 40, at a synchronization step 82. At this step, the controller copies valid blocks from structure 42 back to their corresponding locations in structure 40 (overwriting the previous version in structure 40). Once this copy operation has been performed, the corresponding block identifier is erased from the block pointer list. The controller may be programmed to perform step 82 when the block pointer list exceeds a certain length and/or during periods in which device 20 is otherwise idle.

At times, it may be desirable for controller 32 to make multiple changes in data blocks 50 in immediate succession. For example, in the embodiment of FIG. 1, the user of device 20 may choose to download and store in memory 30 multiple media files 24 in a single operation, along with the corresponding keys 26. For this purpose, the controller may be programmed to operate in a "transaction mode." In this mode, the controller creates an additional copy 90 in the memory of the current valid version of the top-level block, as illustrated in FIG. 5.

Upon the first modification to any data block or signature block in transaction mode, controller 32 copies the block, with the modification, to its mirror location (or from its mirror location back to the default location, if the mirror copy is the current valid version). The controller updates the signatures and block pointers in copy 90 of the top-level block according to the data and signature blocks that have been modified, and then moves on to process the next modification in the same manner. Thus, copy 90 may accumulate multiple changes in block pointers 64, and will contain a value of top-level signature 60 that reflects all of the modifications that have been made to the lower blocks. If any block is modified more than once in the same transaction (i.e., before the controller exits from the transaction mode), the modifications are made to the already-modified copy of that block in its current location (mirror or default), rather than toggling back to the previous location of the block.

When the transaction is completed, controller 32 overwrites the earlier version of the top-level block (i.e., block 58 or 58') with copy 90, including the incremented value of validity counter 62. The copied version of the top-level block, including block pointers corresponding to all of the modified blocks, now becomes the valid version. If the transaction is aborted before completion, copy 90 is simply discarded. In this case, the unmodified later version of the top-level block contains block pointers that point to the pre-transaction versions of the lower-level blocks and should contain the correct top-level signature to verify these pre-transaction versions. Thus, if block 58', for example, is the valid version of the top-level block before the transaction, the controller will either overwrite block 58 with the contents of copy 90 to complete the transaction (whereupon block 58 becomes the valid version), or will leave block 58' as the valid version if the transaction is aborted.

Given the use of structures 40 and 42 to hold the integrity hierarchy, controller 32 will access data in the structure as follows: When the controller receives a request to access a data item in a given data block 50, it first checks the values of validity counter 62 in top-level blocks 58 and 58' to determine which of the top-level blocks is the current valid version. Block pointers 64 in this top-level block then indicate to the controller where the current versions of the data block and the relevant signature blocks are located, i.e., whether each of the blocks is located in structure 40 or 42.

The controller then reads the given data block from the appropriate location and verifies the integrity of the data block against the signatures in all the levels of the hierarchy. The steps involved in this verification process are described in greater detail, for example, in the above-mentioned patent application entitled "Optimized Hierarchical Integrity Protection for Stored Data." If all of the signatures match their stored values, the controller verifies that the integrity of the data structure is intact and reads out the data item. In the case of media player device 20 (FIG. 1), for example, the controller may use the data item (key 26) to decrypt and play the corresponding media file 24.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data integrity protection, comprising:
   arranging in an integrity hierarchy a plurality of data blocks, which contain data, the integrity hierarchy including multiple levels of signature blocks containing signatures computed respectively over lower levels in the hierarchy, wherein the levels culminate in a top-level block that contains a top-level signature computed over all of the hierarchy;
   storing the plurality of data blocks of the integrity hierarchy in respective first locations in a storage medium;
   receiving a modification to be made in the data stored in a given data block within the integrity hierarchy;
   in response to the modification, recomputing one or more of the signatures in the integrity hierarchy, including the top-level signature;
   storing, in respective second locations in the storage medium, copies of the given data block in which the modification has been made and copies of the signature blocks containing the signatures that have been recomputed, including a copy of the top-level block;
   recording, in the copy of the top-level block, pointers to the respective second locations of the given data block and the signature blocks containing the signatures that have been recomputed, wherein the pointers comprise a list of the data blocks and the signature blocks in the lower levels of the hierarchy of which valid copies are stored in the second location; and
   recording in the copy of the top-level block an indication that the copy is a valid version of the top-level block.

2. The method according to claim 1, further comprising:
   receiving a subsequent modification to the data after recording the copy of the top-level block; and
   in response to the subsequent modification, performing a subsequent recomputation of the signatures in the hierarchy, including the top-level signature, and storing a subsequent copy of the top-level block in the first location with the indication that the subsequent copy is the valid version.

3. The method according to claim 2, further comprising:
   reading the indication from the copies of the top-level block in the first and second locations;
   identifying the copy of the top-level block that is the valid version responsively to the indication; and
   accessing the data in one or more of the data blocks using the valid version.

4. The method according to claim 1, wherein storing the copies in the respective second locations comprises storing the copy of the top-level block only after the given data block and the signature blocks in the lower levels in the integrity hierarchy have been copied.

5. The method according to claim 4, wherein receiving the modification comprises receiving a transaction comprising multiple requests for modifications to be made in the data, and wherein storing the copies in the respective second locations comprises completing all of the modifications that are associated with the transaction in the data and signature blocks in the lower levels in the integrity hierarchy before storing the copy of the top-level block.

6. The method according to claim 1, wherein the pointers comprise a respective flag for each of the data blocks and the signature blocks in the lower levels of the integrity hierarchy, indicating whether valid copies of the blocks are stored in the first or the second locations.

7. The method according to claim 1, wherein recomputing the one or more of the signatures comprises recomputing a block signature of the given block.

8. A data storage system for providing data integrity protection, the data storage system comprising:
- a non-volatile memory; and
- a processor for managing data stored in the non-volatile memory, the processor configured to:
  - arrange a plurality of data blocks containing data in an integrity hierarchy, the integrity hierarchy including multiple levels of signature blocks containing signatures computed respectively over lower levels in the hierarchy, wherein the levels culminate in a top-level block that contains a top-level signature computed over all of the hierarchy;
  - store the plurality of data blocks of the integrity hierarchy in respective first locations in the non-volatile memory;
  - receive a modification to be made in the data stored in a given data block within the integrity hierarchy;
  - in response to the modification, recompute one or more of the signatures in the integrity hierarchy, including the top-level signature;
  - store in respective second locations in the non-volatile memory, copies of the given data block in which the modification has been made and of the copies of the signature blocks containing the signatures that have been recomputed, including a copy of the top-level block;
  - record, in the copy of the top-level block, pointers to the respective second locations of the given data block and the signature blocks containing the signatures that have been recomputed, wherein the pointers comprise a list of the data blocks and the signature blocks in the lower levels of the hierarchy of which valid copies are stored in the second location; and
  - record in the copy of the top-level block an indication that the copy is a valid version of the top-level block.

* * * * *

UNITED STATES PATENT AND TRADEMARK OFFICE
CERTIFICATE OF CORRECTION

PATENT NO. : 8,082,236 B2
APPLICATION NO. : 12/252784
DATED : December 20, 2011
INVENTOR(S) : Arseniy Aharonov et al.

Page 1 of 1

It is certified that error appears in the above-identified patent and that said Letters Patent is hereby corrected as shown below:

In the Claims

In column 12, claim 8, line 11, after "has been made and" delete "of the".

Signed and Sealed this
Tenth Day of July, 2012

David J. Kappos
*Director of the United States Patent and Trademark Office*